(12) United States Patent
Brosnan et al.

(10) Patent No.: US 8,643,602 B2
(45) Date of Patent: Feb. 4, 2014

(54) DEVICE AND METHOD FOR PERFORMING OPTICAL NAVIGATION WITHOUT USING LENSES

(75) Inventors: Michael J. Brosnan, Fremont, CA (US); Timothy J. Orsley, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 659 days.

(21) Appl. No.: 12/473,466

(22) Filed: May 28, 2009

(65) Prior Publication Data

US 2010/0302208 A1 Dec. 2, 2010

(51) Int. Cl.
*G06F 3/033* (2013.01)

(52) U.S. Cl.
USPC ........................................................ 345/166

(58) Field of Classification Search
USPC .................................................. 345/163, 166
See application file for complete search history.

(56) References Cited

U.S. PATENT DOCUMENTS

| 6,829,375 | B1 | 12/2004 | Higuchi |
| 7,244,925 | B2 | 7/2007 | Xie |
| 2004/0090420 | A1* | 5/2004 | Black ............................. 345/166 |
| 2005/0083310 | A1 | 4/2005 | Safai et al. |
| 2005/0094154 | A1* | 5/2005 | Baney et al. ................... 356/499 |
| 2006/0007148 | A1 | 1/2006 | Theytaz et al. |
| 2006/0256086 | A1 | 11/2006 | Xie et al. |
| 2007/0138378 | A1* | 6/2007 | Chang ............................ 250/221 |
| 2007/0188457 | A1* | 8/2007 | Wu et al. ........................ 345/166 |

\* cited by examiner

*Primary Examiner* — Jonathan Boyd (57) ABSTRACT

An optical navigation device and method for performing optical navigation uses an optically transparent flexible film, which is positioned over a sensor that includes an image sensor array, to allow the image sensor array to receive imaging light from a target surface that is produced in response to illumination light emitted into the target surface from a light source. The imaging light from the target surface is received at the image sensor array of the sensor to capture frames of image data of the target surface. The frames of image data are then compared to estimate relative displacements between the target surface and the image sensor array.

20 Claims, 7 Drawing Sheets

DEVICE AND METHOD FOR PERFORMING OPTICAL NAVIGATION WITHOUT USING LENSES

BACKGROUND OF THE INVENTION

Optical navigation systems detect relative movements between the optical navigation systems and navigation surfaces to perform tracking operations. An optical navigation system uses a light source to generate illumination light on a navigation surface and an image sensor to successively capture frames of image data of the navigation surface using reflected illumination light. The optical navigation system compares the successive frames of image data and estimates the relative movements between the optical navigation system and the navigation surface based on the comparison between the current frame of image data and a previous frame of image data. The optical navigation system is able to track the relative movements between the optical navigation system and the navigation surface by continuously capturing and comparing frames of image data.

Optical navigation systems are commonly used in optical computer mice to track the movements of the mice relative to the navigation surfaces on which the mice are manually manipulated. Optical navigation systems are also used in optical finger navigation devices. In an optical finger navigation device, the surface of a finger is used as the navigation surface to track the relative movements of the finger relative to the optical finger navigation device.

A conventional optical finger navigation device includes a light source and a sensor chip with an image sensor array, which are mounted on a printed circuit board. The optical finger navigation device includes one or more lenses to optically manipulate light from the light source, which is reflected from the finger, onto the image sensor array of the sensor chip. However, these lenses add significant height to the optical finger navigation device, and increases manufacturing complexity and cost to the optical finger navigation device.

Thus, there is a need for a device and method for performing optical finger navigation that reduces the height of the device and reduces the manufacturing complexity and cost to the device.

SUMMARY OF THE INVENTION

An optical navigation device and method for performing optical navigation uses an optically transparent flexible film, which is positioned over a sensor that includes an image sensor array, to allow the image sensor array to receive imaging light from a target surface that is produced in response to illumination light emitted into the target surface from a light source. The imaging light from the target surface is received at the image sensor array of the sensor to capture frames of image data of the target surface. The frames of image data are then compared to estimate relative displacements between the target surface and the image sensor array.

An optical navigation device in accordance with an embodiment of the invention comprises a light source, a sensor and an optically transparent flexible film. The light source is configured to emit illumination light. The sensor includes an image sensor array configured to electronically capture frames of image data of a target surface using imaging light from the target surface. The imaging light from the target surface is produced in response to the illumination light emitted into the target surface. The frames of image data provide displacement information of the target surface relative to the optical navigation device. The flexible film has an upper surface and a lower surface. The flexible film is positioned relative to the image sensor array of the sensor such that the imaging light from the target surface is transmitted out of the lower surface of the flexible film onto the image sensor array of the sensor.

A method for performing optical navigation in accordance with an embodiment of the invention comprises emitting illumination light from a light source into a target surface to produce imaging light from the target surface, transmitting the imaging light from the target surface through an optically transparent flexible film toward a sensor that includes an image sensor array, receiving the imaging light from the target surface that is transmitted out of the flexible film at the image sensor array of the sensor to capture frames of image data of the target surface, and comparing the frames of image data of the target surface to estimate relative displacements between the target surface and the image sensor array.

An optical navigation device in accordance with another embodiment of the invention comprises a light source, a sensor and an optically transparent flexible circuit film. The light source is configured to emit illumination light. The sensor includes an image sensor array configured to electronically capture frames of image data of a target surface using imaging light from the target surface. The imaging light from the target surface is produced in response to the illumination light emitted into the target surface. The frames of image data provide displacement information of the target surface relative to the optical navigation device. The flexible circuit film has an upper surface and a lower surface. The flexible circuit film is positioned relative to the light source and the image sensor array of the sensor such that the illumination light from the light source is transmitted into the target surface through the flexible circuit film and the imaging light from the target surface is transmitted onto the image sensor array of the sensor through the flexible circuit film. The flexible circuit film includes conductive traces. At least one of the conductive traces is electrically connected to the sensor.

Other aspects and advantages of the present invention will become apparent from the following detailed description, taken in conjunction with the accompanying drawings, illustrated by way of example of the principles of the invention.

DETAILED DESCRIPTION

Figure 1:
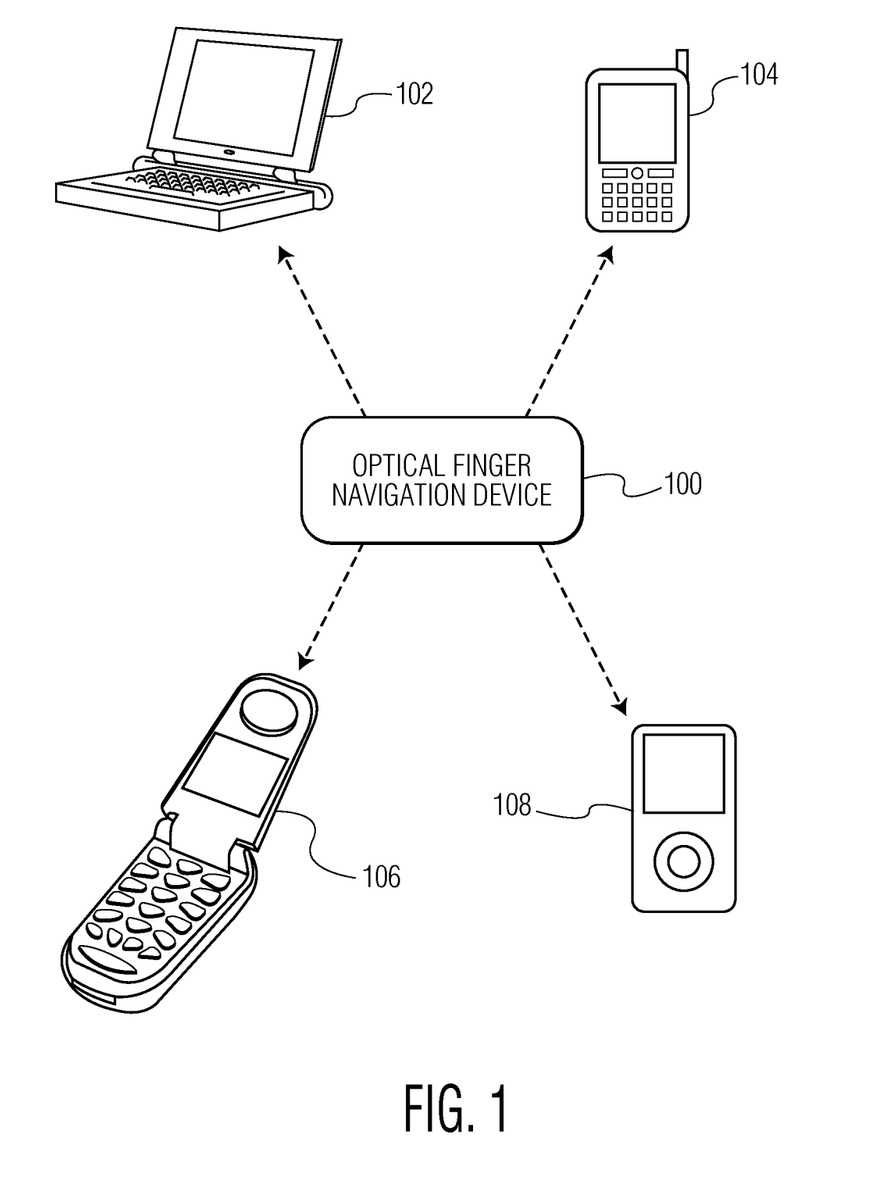
FIG. 1 shows an optical finger navigation device in accordance with an embodiment of the invention, which may be used in various electronic devices.

With reference to FIG. 1, an optical finger navigation device 100 in accordance with an embodiment of the invention is described. The optical finger navigation device 100 allows a user to use a finger to navigate within an electronic environment. As an example, the optical finger navigation device 100 may be used to control a cursor displayed on an electronic screen or to move between different interactive graphic elements displayed on the electronic screen. The optical finger navigation device may be used as a control device in various electronic devices, such as a notebook computer 102, a personal digital assistant (PDA) 104, a cellular phone 106 and a portable media player 108, as illustrated in FIG. 1.

Figure 2:
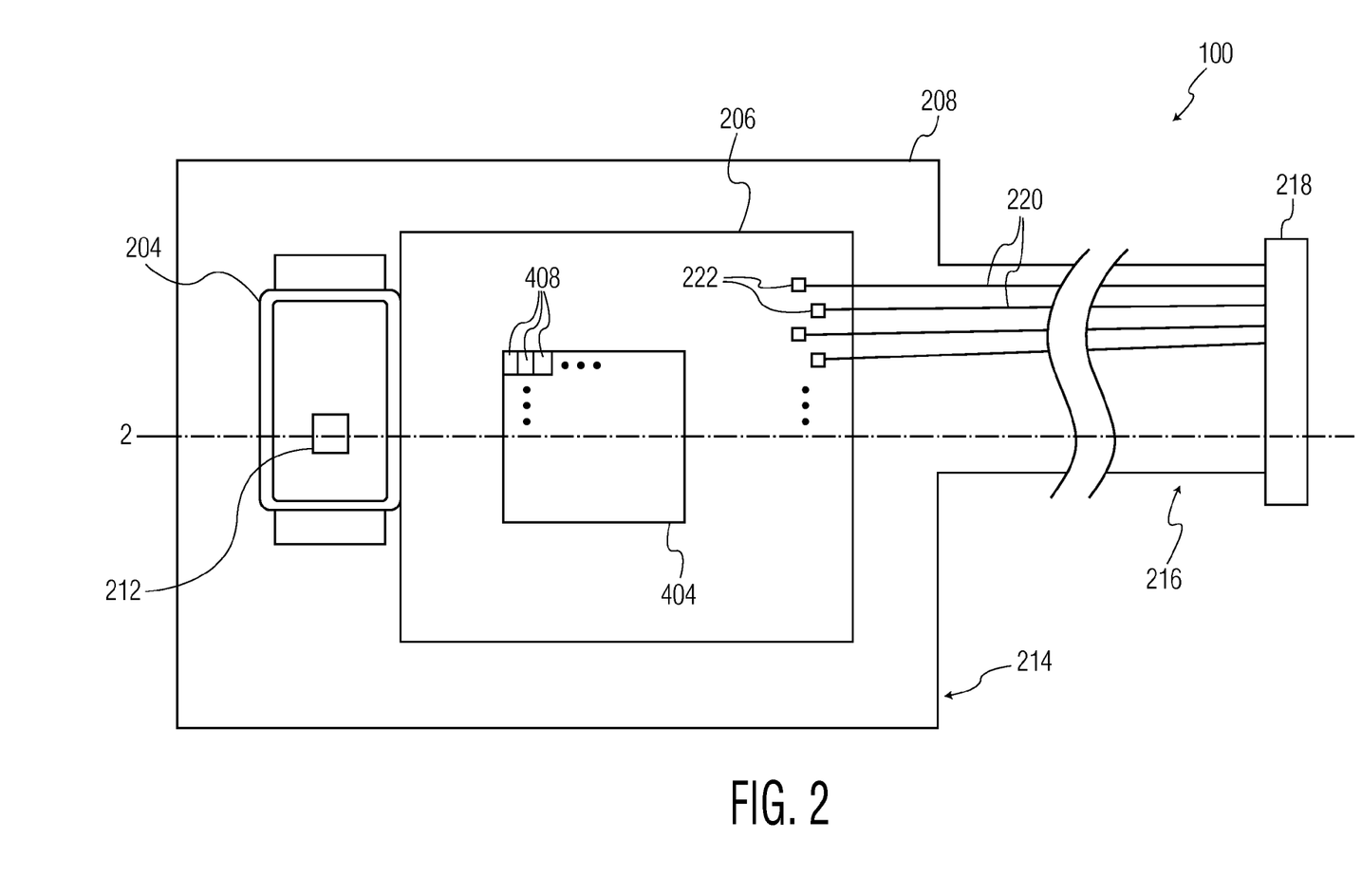
FIG. 2 is a top view of the optical finger navigation device of FIG. 1.
Figure 3:
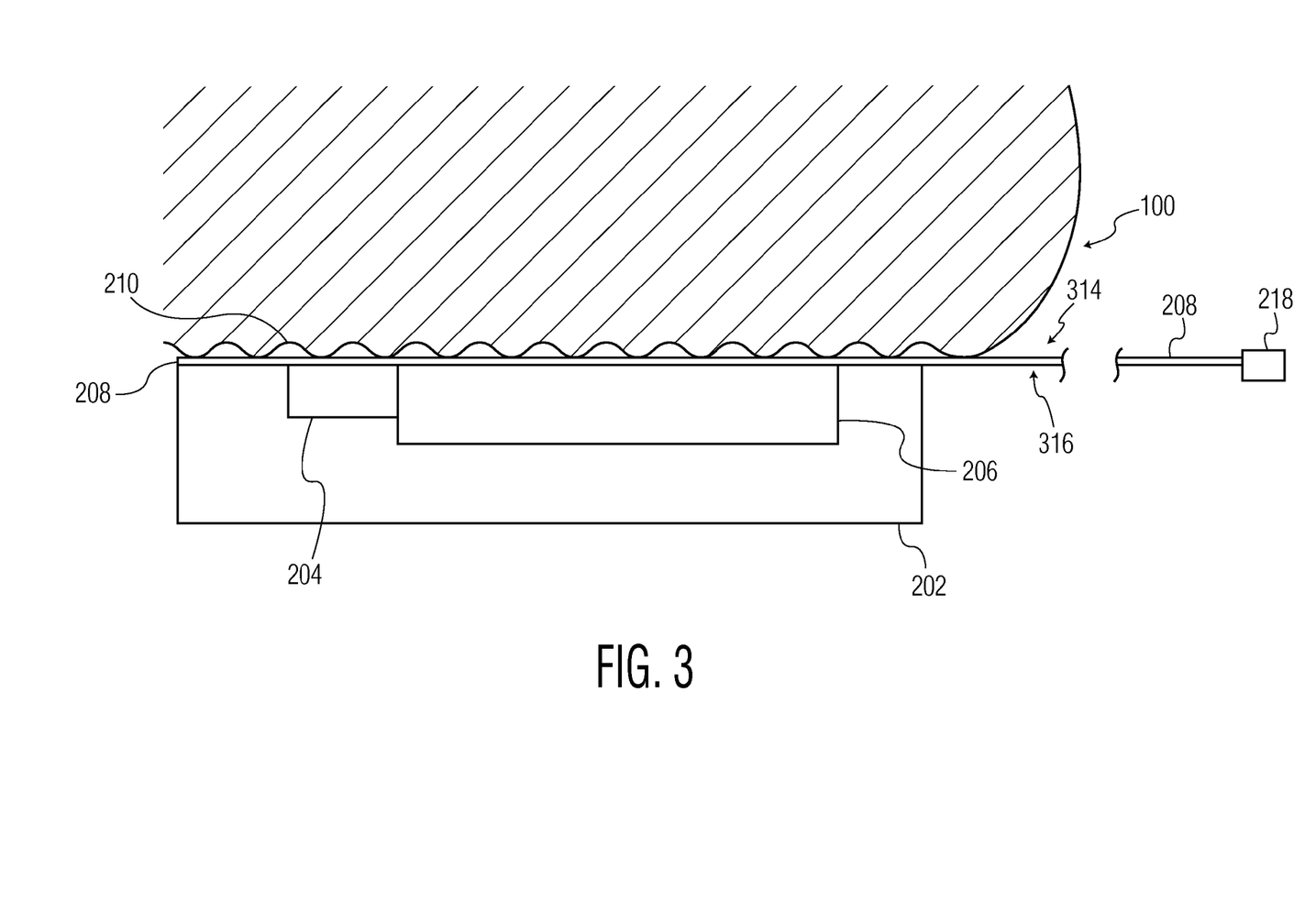
FIG. 3 is a cross-sectional side view of the optical finger navigation device of FIG. 1 along ling 2-2.

Turning now to FIGS. 2 and 3, components of the optical finger navigation device 100 in accordance with an embodiment of the invention are illustrated. FIG. 2 is a top view of the optical navigation device 100, while FIG. 3 is a cross-sectional side view of the optical navigation device along the line 2-2, as shown in FIG. 2. The optical finger navigation device 100 includes a base 202, a light source 204, a navigation sensor 206 and an optically transparent flexible film 208. The light source 204 and the navigation sensor 206 are attached to the base 202. The flexible film 208 is positioned over the light source 204 and the navigation sensor 206 so that the light source and the navigation sensor are situated between the base 202 and the flexible film.

The base 202 of the optical finger navigation device 100 is a rigid structure to provide structural support for the other components of the optical finger navigation device 100. The base 202 can be made of any material, which may or may not be electrically conductive, that can provide the desired rigidity for the base. As an example, the base 202 can be made of a plastic material.

The light source 204 of the optical finger navigation device 100 includes an upper major side and a lower major side. The upper major side of the light source 204 is the light emitting side of the light source. The lower major side of the light 204 is the side opposite the upper major side. The lower major side of the light source 204 is connected to the base 202 so that light from the light source is emitted toward the optically transparent flexible film 208 and transmitted into a target navigation surface 210 (shown only in FIG. 3), which is typically a fingertip surface of a finger of a user, through the flexible film. Since the optical finger navigation device 100 is designed for a fingertip surface of a user, the target navigation surface 210 will sometimes be referred to herein as the fingertip surface. However, it is explicitly noted here, that other surfaces may be used as the target navigation surface 210. As shown in FIG. 2, the light source 204 includes a light emitting semiconductor die 212 at the upper major side of the light source, which is the light emitting side of the light source. The light emitting semiconductor die 212 may be a light emitting diode, a laser diode or any other semiconductor die that can emit any type of light, such as visible or infrared (IR) light. In an embodiment, the semiconductor die 212 is a vertical emitting IR LED die. Although the light source 204 is shown to be positioned between the flexible film 208 and the base 202, the light source can be positioned at different locations in other embodiments as long as the light from the light source can be transmitted into the fingertip surface.

Figure 4:
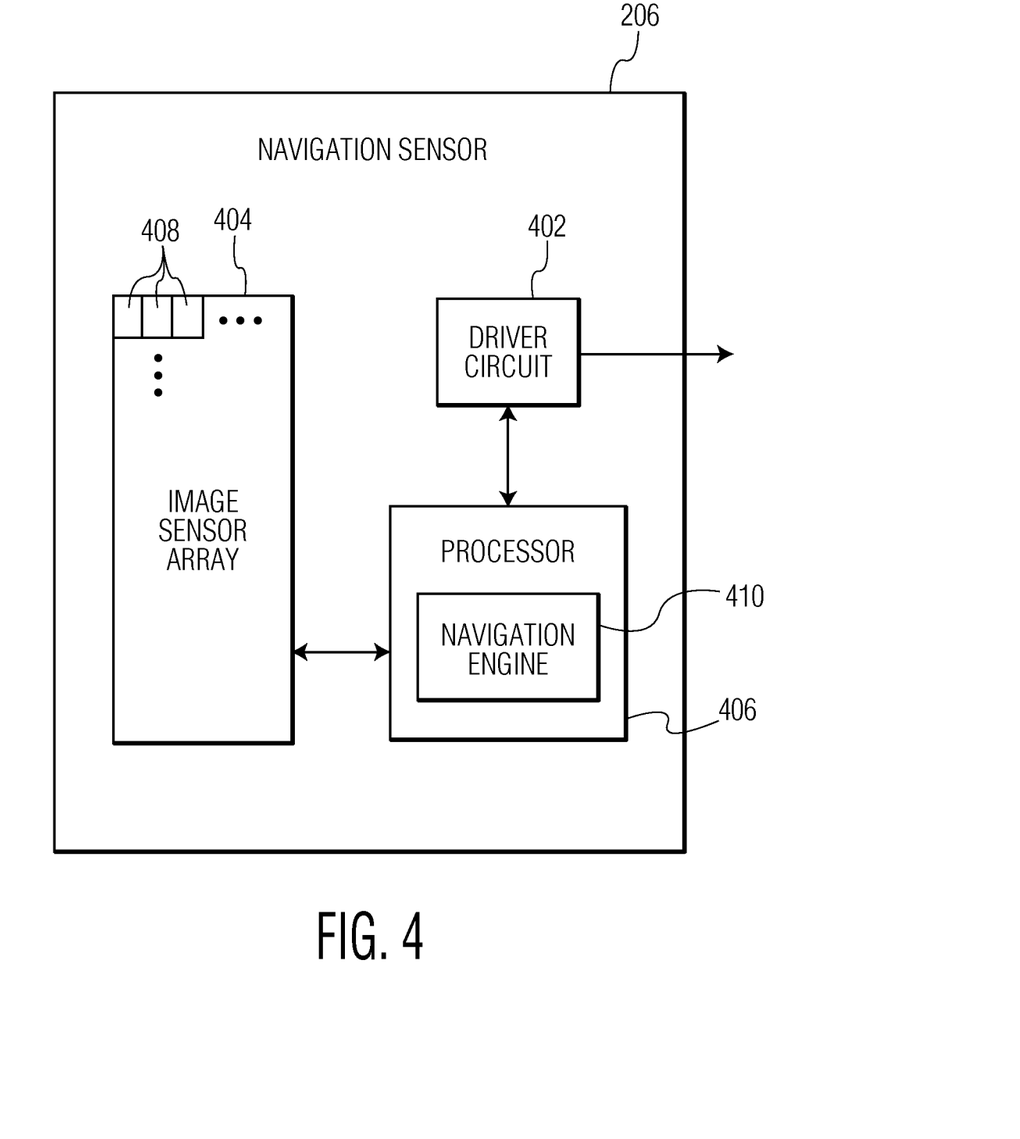
FIG. 4 is a block diagram of a navigation sensor of the optical finger navigation device in accordance with an embodiment of the invention.

The navigation sensor 206 of the optical finger navigation device 100 is also attached to the base 202. In an embodiment, as illustrated in FIG. 4, the navigation sensor 206 may be an integrated circuit chip, which includes a driver circuit 402, an image sensor array 404 and a processor 406. The navigation sensor 206 may also include supporting circuitry (not shown) for the image sensor array 404, such as an analog-to-digital converter and row and column decoders. The navigation sensor 206 may also include other elements commonly found in a conventional navigation sensor for use in optical finger navigation.

The driver circuit 402 of the navigation sensor 206 is configured to generate driving signals for the light source 204. In an embodiment, the driving signals from the driver circuit 402 are transmitted to the light source 204 via the flexible film 208, as described in more detail below, to activate the light source to generate illumination light, which is emitted into the fingertip surface 210. The illumination light emitted into the fingertip surface 210 is scattered within the finger, causing the finger to "glow" or radiate light. This light produced in response to the illumination light emitted into the fingertip surface 210 is referred to herein as "imaging light."

The image sensor array 404 of the navigation sensor 206 is an array of photosensitive pixel elements 408 that generate signals in response to light incident on the elements, where each signal represents the amount or intensity of light incident on a particular element of the image sensor array. These signals are referred to herein as image data. Thus, the image sensor array 404 is able to sequentially capture frames of image data in response to incident light, i.e., the imaging light from the fingertip surface 210 that is received by the image sensor array. These frames of image data are used for image correlation to estimate any displacement of the fingertip surface 210 with respect to the image sensor array 404 of the optical finger navigation device 100. As an example, the image sensor array 404 may be a charge-coupled device (CCD) imaging array or a complementary metal oxide semiconductor (CMOS) imaging array. The number of photosensitive pixel elements 408 included in the image sensor array 404 may vary. As an example, the image sensor array 404 may be a 21×21 array of photosensitive pixel elements, which may include a 19×19 array of active photosensitive pixel elements with a frame of dummy pixel elements.

The processor 406 of the navigation sensor 206 is configured to control various components of the navigation sensor, including the driver circuit 402 and the image sensor array 404, in order to provide the illumination light emitted into the fingertip surface 210 and to electronically capture frames of image data of the fingertip surface in response to the imaging light from the fingertip surface. The processor 406 is electrically connected to the driver circuit 402 to provide control signals to the driver circuit to direct the driver circuit to apply driving signals to the light source 204 to activate the light source. The processor 406 is also electrically connected to the image sensor array 404 via supporting circuitry (not shown) to provide control signals to control the accumulation of electrical signals or charges at the photosensitive pixel elements 408 of the image sensor array to produce each frame of image data for correlation. Thus, the processor 406 is able to control the frame rate of the image sensor array 404.

The processor 406 may be a general-purpose digital processor such as a microprocessor or microcontroller. In other embodiments, the processor 406 may be a special-purpose processor such as a digital signal processor. In other embodiments, the processor 406 may be another type of controller or a field programmable gate array (FPGA).

In an embodiment, the processor 406 includes a navigation engine 410, which is programmed into the processor. However, in other embodiments, the navigation engine 410 may be a separate component. The navigation engine 410 can be implemented in any combination of software, hardware and/or firmware. The navigation engine 410 operates to correlate the frames of image data captured by the image sensor array 404 to estimate any lateral displacement changes of the fingertip surface 210 with respect to X and Y directions, which are parallel to the upper surface of the navigation sensor 206. The process of correlating frames of image data for motion estimation or navigation is well known, and thus, is not described herein. In an embodiment, the output of the navigation engine 410 includes directional delta x displacement values and directional delta y displacement values. Each directional displacement value includes negative or positive sign information, which indicates direction, and an absolute displacement value, which indicates the amount of displacement in that direction. Thus, the x displacement value indicates displacement change along the X axis, while the y displacement value indicates displacement change along the Y axis. In a particular implementation, the directional delta x and y displacement values are generated in the form of hex numbers.

Although the driver circuit 402, the image sensor array 404 and the processor 406 are integrated into the navigation sensor 206 in the illustrated embodiment, some or all of these components may be physically separate devices in other embodiments.

The optically transparent flexible film 208 of the optical finger navigation device 100 in accordance with an embodiment of the invention is now described in more detail with reference to FIGS. 2 and 3. As shown in FIGS. 2 and 3, the flexible film 208 extends over both the light source 204 and the navigation sensor 206. The flexible film 208 includes an upper surface 314 and a lower surface 316. The upper surface 314 of the flexible film 208 is the surface on which the fingertip surface 210 engages the optical finger navigation device 100. Thus, during normal operation, the fingertip surface 210 contacts the upper surface 314 of the flexible film and moves along the upper surface. The lower surface 316 of the flexible film 208 is designed to receive the illumination light from the light emitting semiconductor die 212 of the light source 204 and to transmit the imaging light from the fingertip surface 210 out of the lower surface 316 of the flexible film onto the image sensor array 404 of the navigation sensor 206. Thus, the optically transparent flexible film 208 acts as a medium for transmission of the illumination light from the light emitting semiconductor die 212 to the fingertip surface 210 and transmission of the imaging light from the fingertip surface to the image sensor array 404.

During operation when the fingertip surface 210 is on the upper surface 314 of the flexible film 208 over the image sensor array 404 of the navigation sensor 206, the illumination light from the light source 204 is emitted into the fingertip surface, causing the finger to "glow" or radiate imaging light due to the scattering of the illumination light within the finger. As the imaging light is radiated from the finger, the ridges and valleys of the fingertip surface cause different Fresnel reflections due to presence of air in spaces between the fingertip valleys and the flexible film 208 and absence of air between the fingertip ridges and the flexible film. The different Fresnel reflections produce sufficient contrast to distinguish the valleys and ridges of the fingertip 210 in the captured frames of image data, which can be used to estimate relative displacements of the fingertip on the optical navigation device 100.

The optically transparent flexible film 208 can be made of various optically transparent flexible materials. As an example, the flexible film 208 can be made of polymer, such as polyimide. In some embodiments, the flexible film 208 is made of Kapton ("Kapton" is a trademark of DuPont). In an embodiment, the upper surface 314 of the flexible film 208 may be coated with a transmission-enhancing material to increase the transmissivity of the flexible film. As an example, the flexible film may be coated with Teflon AF ("Teflon" is a trademark of Dupont). In the embodiment in which the light source 204 emits IR light, the transmission-enhancing coating may have transmission-enhancing characteristics targeted for IR light.

The thickness of the optically transparent flexible film 208 can be relatively thin with respect to the overall thickness of the optical finger navigation device 100. As an example, the flexible film 208 may be 10 μm-100 μm, e.g., approximately 25 μm±10 μm. During operation when the fingertip surface 210 is on the upper surface 314 of the flexible film 208 over the image sensor array 404 of the navigation sensor 206, the close proximity of an area of the fingertip surface being imaged to the image sensor array does not provide enough space for the imaging light from the imaged fingertip area to scatter greatly, resulting in frames of image data that can be effectively used for optical navigation.

In the illustrated embodiment, as shown in FIG. 2, the optically flexible film 208 includes a main region 214 and a tail region 216. The flexible film 208 further includes conductive traces 220 with input/output (I/O) bond pads 222 that extend across the tail region 216 of the flexible film to a connector 218. The I/O bond pads 222 are used to electrically connect to the navigation sensor 206, while the connector 218 is used to electrically connect to an external circuitry of an electronic device, such as the notebook computer 102, the PDA 104, the cellular phone 106 or the portable media player 108. Thus, the flexible film 208 can be viewed as being a flexible circuit film or a flex circuit. In this embodiment, an anisotropic conductive film (ACF) may be used to bond the navigation sensor 206 to the flexible film 208, electrically connecting at least some I/O bond pads (not shown) of the navigation sensor 206 to at least some of the I/O bond pads 216 of the flexible film. In some embodiments, the light source 204 may also be electrically connected to at least one other conductive trace of the flexible film 208 to be electrically connected to the navigation sensor 206.

Figure 5A:
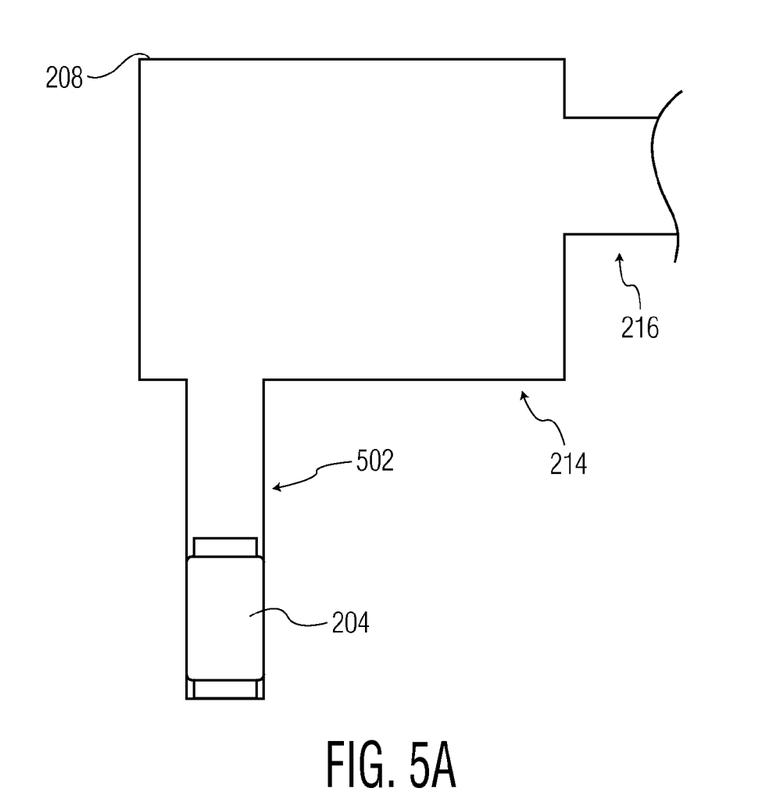
FIG. 5A is a top view of an optically transparent flexible film with a flap region in accordance with an embodiment of the invention.
Figure 5B:
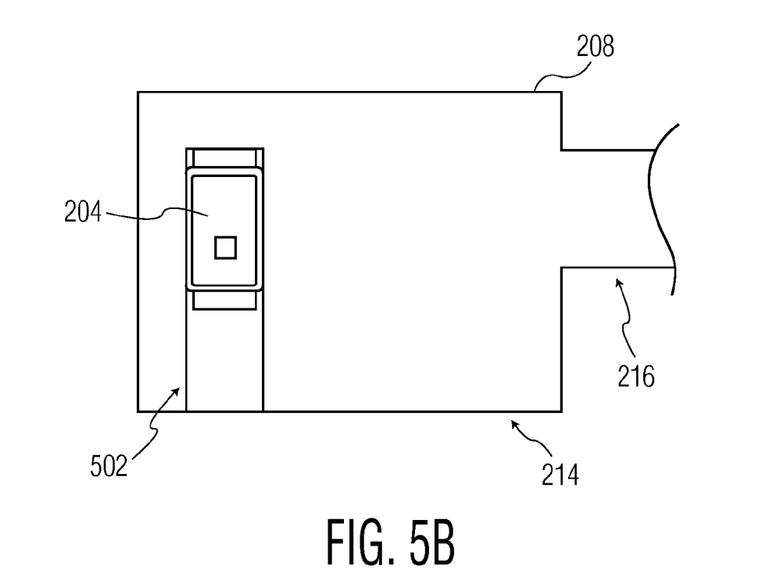
FIG. 5B is a top view of the optically transparent flexible film of FIG. 5A with the flap region folded.

In an embodiment, as shown in FIG. 5A, the flexible film 208 further includes a flap region 502, which is used to attach the light source 204 to the flexible film. In this embodiment, the bottom major side of the light source 204 is attached to the lower surface 316 of the flap region of the flexible film 208 such that the light emitting side of the light source 204, i.e., the upper major side, is facing away from the flap region. The flap region 502 of the flexible film 208 with the attached light source 204 is then folded underneath the main portion of the flexible film so that the light emitting side of the light source now faces the lower surface 316 of the main region 214 of the flexible film, as illustrated in FIG. 5B. Thus, in this embodiment, the lower major side of the light source 204 is connected to the base 202 via the flap region 502 of the flexible film 208. In addition, the light source 204 may be electrically connected to the navigation sensor 206 using at least one electrical trace of the flexible film 208 that extends across the flap region 502 of the flexible film 208 toward the navigation sensor. In other embodiments, the light source 204 may be attached to the base 202 without the use of the flap region 502 of the flexible film 208 and/or the light source may be electrically connected to the navigation sensor 206 using electrical connections or paths other than the electrical traces of the flexible film.

Figure 6:
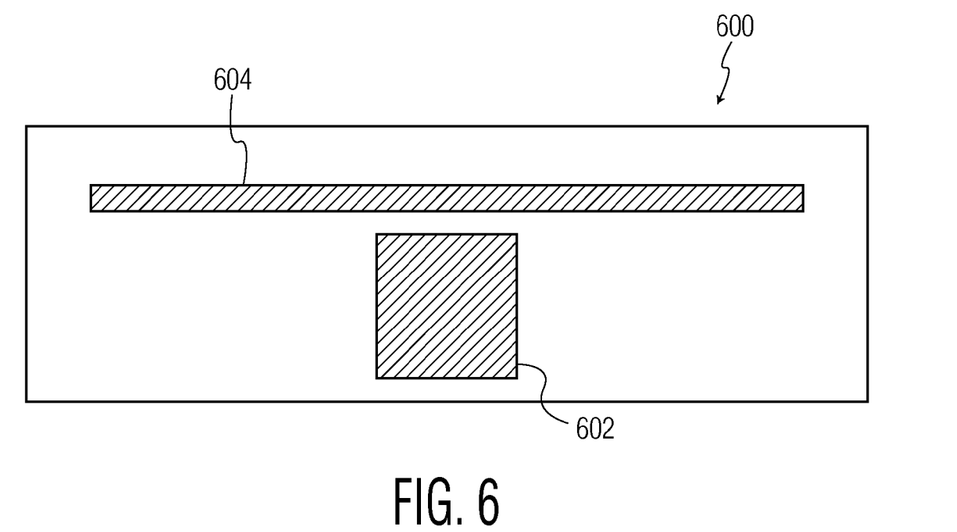
FIG. 6 is a diagram of a navigation sensor in accordance with another embodiment of the invention.

Turning now to FIG. 6, a navigation sensor 600 in accordance with another embodiment of the invention is shown. The navigation sensor 600 may be used in the optical finger navigation device 100 instead of the navigation sensor 206. In this embodiment, the navigation sensor 600 includes two image sensor arrays 602 and 604, which are used for different modes of operation. The first image sensor array 602 is designed to be used during an optical navigation mode of operation to track the movements of the fingertip surface 210. The second image sensor array 604 is designed to be used during a fingerprint imaging mode of operation, which may be part of a fingerprint authentication process or other processes in which a fingerprint image is needed.

The first image sensor array 602 of the navigation sensor 600 is a square or slightly rectangular image sensor array that can capture frames of image data that are sufficiently large for correlation to compute relative displacement values. In general, the first image sensor array 602 is at least a 5×5 array of active photosensitive pixel elements. The first image sensor array 602 may be identical to the image sensor array 404 of the navigation sensor 206.

The second image sensor array 604 of the navigation sensor 600 is a thin elongate image sensor array that can be used to image the entire fingertip surface 210 or a significant portion of the fingertip surface when the fingertip surface is scanned across the second image sensor array in a direction perpendicular to the length of the second image sensor array. In general, the second image sensor array 604 has dimensions such that width-to-length ratio of active photosensitive pixels of the second image sensor array is at least 1 to N, where N is an integer equal to or greater than 5. As an example, the second image sensor array may be a 1×128 array of active photosensitive pixel elements with dummy pixel elements surrounding the active pixel elements.

In an embodiment, when the optical finger navigation device 100 is being operated in the optical navigation mode, only the first image sensor array 602 is used to successively capture frames of image data of the fingertip surface 210 for relative displacement estimation. However, when the optical finger navigation device 100 is being operated in the fingerprint imaging mode, both the first and second image sensor arrays 602 and 604 are used together to image the fingertip surface 210. The first image sensor array 602 is used to obtain rate and position information of the finger, i.e., how fast the finger is being swiped across the optical finger navigation device 100 and how straight the finger is traveling. The second image sensor array 604 is used to image the fingertip surface 210 in a scanning fashion, i.e., stitching multiple partial images of the fingertip surface to create a single composite image of the fingertip surface, similar to the manner in which a scanner images a document.

Figure 7:
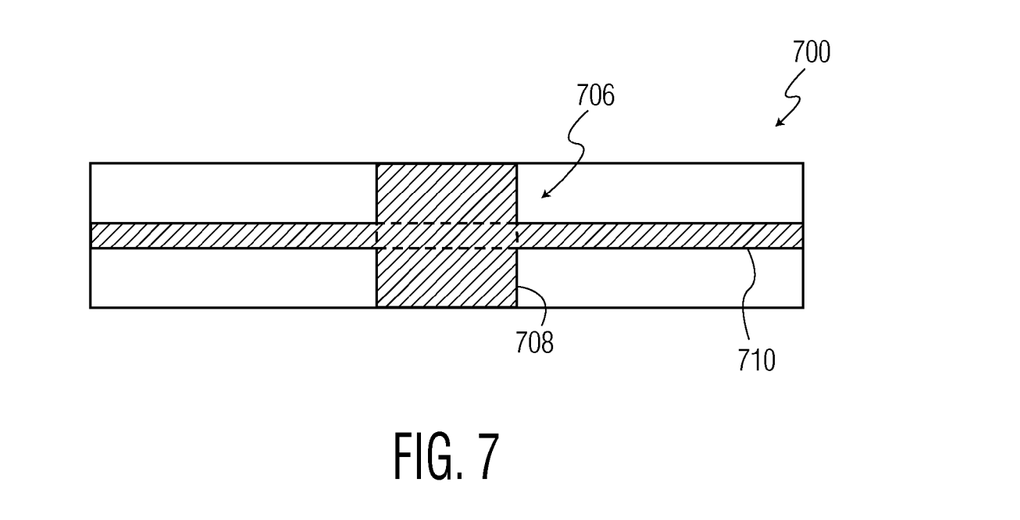
FIG. 7 is a diagram of a navigation sensor in accordance with an alternative embodiment of the invention.

Turning now to FIG. 7, a navigation sensor 700 in accordance with an alternative embodiment of the invention is shown. The navigation sensor 700 of FIG. 7 is similar to the navigations sensor 600 of FIG. 6. However, in this alternative embodiment, the navigation sensor 700 includes a single integrated image sensor array 706, which is an integration of the two image sensor arrays 602 and 604 of the navigation sensor 600 into a single image sensor array. The single image sensor array 706 of the navigation sensor 700 is designed to perform the same operations of the two image sensor arrays 602 and 604 of the navigation sensor 600.

As shown in FIG. 7, the image sensor array 706 includes a first portion 708 and a second portion 710, which partly overlaps the first portion. The first portion 708 of the image sensor array is similar to the first image sensor array 602 of the navigation sensor 600. Consequently, the first portion 708 of the image sensor array 706 is used during the optical navigation mode of operation. The second portion 710 of the image sensor array 706 is similar to the second image sensor array 604 of the navigation sensor 600. Consequently, the second portion 710 of the image sensor array 700 is used during the fingerprint imaging mode of operation. In a particular embodiment where the first portion 708 of the image sensor array 706 includes a 19×19 array of active pixel elements and the second portion 710 of the image sensor array 706 includes a 1×128 array of active pixel elements, the overlapping area of the first and second portions includes 1×19 array of active pixel elements.

Although the first portion 708 of the image sensor array 706 is shown in FIG. 7 as being positioned at the center of the second portion 710, the first portion can be positioned anywhere such that the first portion partly overlaps the second portion. In other embodiments, the first portion 708 of the image sensor array 706 may not overlap the second portion 710 of the image sensor array.

In an embodiment, when the optical finger navigation device 100 is being operated in the optical navigation mode, only the first portion 708 of the image sensor array 706 is used to successively capture frames of image data of the fingertip surface 210 for relative displacement estimation. However, when the optical finger navigation device 100 is being operated in the fingerprint imaging mode, both the first and second portions 708 and 710 of the image sensor array 706 are used together to image the fingertip surface 210. The first portion 708 of the image sensor array 706 is used to obtain rate and position information of the finger, i.e., how fast the finger is being swiped across the optical finger navigation device 100 and how straight the finger is traveling. The second portion 710 of the image sensor array 706 is used to image the fingertip surface 210 in a scanning fashion.

Although the navigation sensors 600 and 700 use one or more optical image sensors with photosensitive pixels, the techniques of using two sensor arrays or a single image sensor array with different portions for a navigation mode of operation and a fingerprint imaging operation can be applied to navigation sensors that use capacitive sensing pixels.

Figure 8:
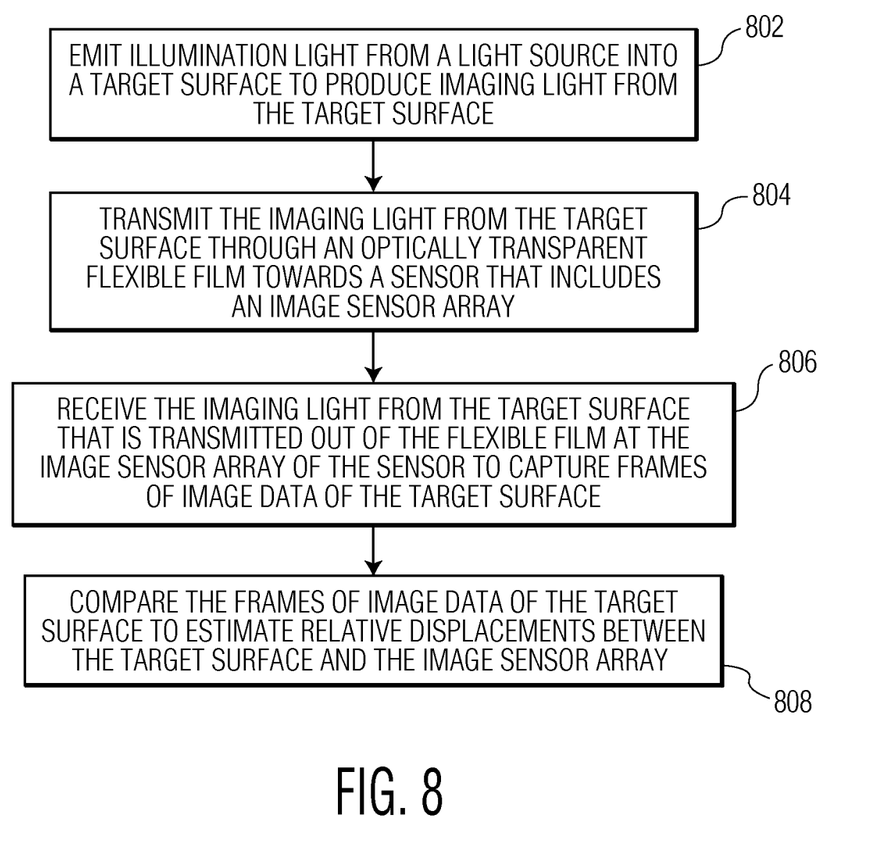
FIG. 8 is a process flow diagram of a method for performing optical finger navigation in accordance with an embodiment of the invention.

A method for performing optical navigation in accordance with an embodiment of the invention is described with reference to a process flow diagram of FIG. 8. At block 802, illumination light is emitted from a light source into a target surface to produce imaging light from the target surface. At block 804, the imaging light from the target surface is transmitted through an optically transparent flexible film toward a sensor that includes an image sensor array. At block 806, the imaging light from the target surface that is transmitted out of the flexible film is received at the image sensor array of the sensor to capture frames of image data of the target surface. At block 808, the frames of image data of the target surface are compared to estimate relative displacements between the target surface and the image sensor array.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An optical navigation device comprising:
   a light source configured to emit illumination light;
   a sensor including an image sensor array configured to electronically capture frames of image data of a target surface using imaging light from the target surface, the imaging light from the target surface being produced in response to the illumination light emitted into the target surface, the frames of image data providing displacement information of the target surface relative to the optical navigation device; and
   an optically transparent flexible film extending at least partially over both the light source and image sensor array and further in direct contact with the light source, the flexible film having an upper surface and a lower surface, the flexible film being positioned relative to the image sensor array of the sensor such that the imaging light from the target surface is transmitted out of the lower surface of the flexible film onto the image sensor array of the sensor.

2. The optical navigation device of claim 1, wherein the optically transparent flexible film includes polyimide.

3. The optical navigation device of claim 2, wherein the upper surface of the optically transparent flexible film is coated with a transmission-enhancing material and is configured to transmit the illumination light from the light source to the target surface.

4. The optical navigation device of claim 1, wherein the optically transparent flexible film includes conductive traces, at least one of the conductive traces being electrically connected to the sensor.

5. The optical navigation device of claim 4, wherein at least one of the electrical traces of the optically flexible film is electrically bonded to the sensor using an anisotropic conductive film.

6. The optical navigation device of claim 1, wherein the light source is configured to emit infrared light.

7. The optical navigation device of claim 1, wherein the sensor including a navigation engine configured to estimate relative displacement between the target surface and the optical navigation device using the frames of image data of the target from the image sensor array.

8. The optical navigation device of claim 1, further comprising a base on which the light source and the sensor are attached, wherein the light source is connected to the base via the flexible film.

9. The optical navigation device of claim 1, wherein the sensor further includes a second image sensor array, said second image sensor array having dimensions such that width-to-length ratio of active photosensitive pixels is at least 1 to N, where N is an integer equal to or greater than 5, said second image sensor array being used to image the target surface in a scanning fashion.

10. The optical navigation device of claim 9, wherein the image sensor array and the second image sensor array are portions of a single image sensor array.

11. A method for performing optical navigation, the method comprising:
emitting illumination light from a light source through an optically transparent flexible film and onto a target surface to produce imaging light from the target surface;
transmitting the imaging light from the target surface through the flexible film toward a sensor that includes an image sensor array;
receiving the imaging light from the target surface that is transmitted out of the flexible film at the image sensor array of the sensor to capture frames of image data of the target surface, wherein the target surface causes different Fresnel reflections due to presence of air in between portions of the target surface and the flexible film and absence of air between other portions of the target surface and the flexible film, and wherein the different Fresnel reflections produce contrast at the image sensor array; and
comparing the frames of image data of the target surface including the contrast of the different Fresnel reflections to estimate relative displacements between the target surface and the image sensor array.

12. The method of claim 11, wherein the transmitting includes transmitting the imaging light from the target surface through the optically transparent flexible film that includes polyimide.

13. The method of claim 12, wherein the upper surface of the optically transparent flexible film is coated with a transmission-enhancing material and is configured to directly engage the target surface.

14. The method of claim 11, further comprising outputting signals from the sensor via at least one conductive trace of the optically transparent flexible film.

15. The method of claim 14, wherein at least one of the electrical traces of the optically flexible film is bonded to the sensor using an anisotropic conductive film.

16. The method of claim 11, wherein the emitting includes emitting infrared light from the light source into the target surface, wherein the target surface comprises a fingertip surface, and wherein the different Fresnel reflections correspond to ridges and valleys of the fingertip surface.

17. The method of claim 11, further comprising imaging the target surface in a scanning fashion using a second image sensor array of the sensor, the second image sensor array having dimensions such that width-to-length ratio of active photosensitive pixels is at least 1 to N, where N is an integer equal to or greater than 5, said second image sensor array being used to image the target surface in a scanning fashion.

18. The method of claim 17, wherein the image sensor array and the second image sensor array are portions of a single image sensor array.

19. An optical navigation device comprising:
a light source configured to emit illumination light;
a sensor including an image sensor array configured to electronically capture frames of image data of a target surface using imaging light from the target surface, the imaging light from the target surface being produced in response to the illumination light emitted onto the target surface, the frames of image data providing displacement information of the target surface relative to the optical navigation device; and
an optically transparent flexible circuit film having an upper surface and a lower surface in direct contact with the light source, the flexible circuit film being positioned relative to the light source and the image sensor array of the sensor such that the illumination light from the light source is transmitted through the flexible circuit film and onto the target surface and the imaging light from the target surface is transmitted through the flexible circuit film and onto the image sensor array of the sensor, the flexible circuit film including conductive traces, at least one of the conductive traces being electrically connected to the sensor.

20. The optical navigation device of claim 19, wherein the sensor further includes a second image sensor array, said second image sensor array having dimensions such that width-to-length ratio of active photosensitive pixels is at least 1 to N, where N is an integer equal to or greater than 5, said second image sensor array being used to image the target surface in a scanning fashion.

* * * * *